(12) United States Patent
Arai et al.

(10) Patent No.: US 6,868,546 B2
(45) Date of Patent: Mar. 15, 2005

(54) DISK DEVICE

(75) Inventors: Toyokazu Arai, Kanagawa (JP); Kiyofumi Sato, Kanagawa (JP); Satoru Manabe, Kanagawa (JP); Tsuneo Uwabo, Kanagawa (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 105 days.

(21) Appl. No.: 10/420,692

(22) Filed: Apr. 23, 2003

(65) Prior Publication Data

US 2003/0202448 A1 Oct. 30, 2003

(30) Foreign Application Priority Data

Apr. 24, 2002 (JP) .................................... P2002-122936

(51) Int. Cl.[7] ............................................. G11B 17/03
(52) U.S. Cl. ...................................................... 720/605
(58) Field of Search ............................... 720/712, 604, 720/605

(56) References Cited

U.S. PATENT DOCUMENTS

| | | | |
|---|---|---|---|
| 4,823,337 A | * | 4/1989 | Van Zanten et al. ........ 720/710 |
| 5,204,850 A | * | 4/1993 | Obata ......................... 720/611 |
| 5,608,705 A | * | 3/1997 | Tanaka ........................ 720/605 |
| 6,222,817 B1 | * | 4/2001 | Uchino et al. .............. 720/648 |
| 6,292,456 B1 | * | 9/2001 | Huang et al. ............... 720/710 |
| 6,388,983 B1 | * | 5/2002 | Kikuchi ....................... 720/710 |
| 6,552,993 B2 | * | 4/2003 | Huang ......................... 720/712 |

* cited by examiner

*Primary Examiner*—David D. Davis
(74) *Attorney, Agent, or Firm*—Whitham, Curtis & Christofferson, PC

(57) ABSTRACT

A disk device for playing back information recorded on an optical disk, includes a device body; a disk tray, moving in the device body between a charging position, into which the optical disk is charged, and a discharging position from which the optical disk is discharged; a chassis, provided in the device body; a turntable, moving between an ascending position and a descending position when the chassis is displaced, and the turntable on which the optical disk is set; and a disk clamper, pivotally arranged on an upper plate of the device body, and clamping the optical disk against the turntable when the turntable is moved to the ascending position. The disk clamper is arranged on the upper plate with a clearance therebetween so that the disk clamper is moved in all radial directions, and an amount of the clearance in a first direction, in which the disk tray moves from the discharging position to the charging position, is smaller than amounts of the clearance in the other directions.

12 Claims, 7 Drawing Sheets

DISK DEVICE

BACKGROUND OF THE INVENTION

The present invention relates to a disk device for playing back information recorded on an optical disk or a disk device for recording and playing back information recorded on an optical disk.

There is provided a disk device for playing back or for recording and playing back information recorded on an optical disk such as a CD-ROM, CD-R, CD-RW or DVD. This disk device includes a box-shaped device body and a disk tray capable of moving with respect to the device body, and the optical disk is accommodated on the disk tray. When the disk tray is moved, the optical disk is charged into the device body. Inside the device body, there is provided a chassis on which an optical disk rotation drive mechanism having a turntable is mounted, and the chassis can be moved upward and downward. On a roof of the device body, there is provided a disk clamper, which is capable of rotating.

When the optical disk is charged into the device body, the turntable is ascended together with the chassis. Therefore, the optical disk is attached to the turntable. Further, the optical disk is held between the disk clamper and the turntable. In the above condition, when a positioning boss protruding from the center of the disk clamper is inserted into and engaged with a hole or recess formed at the center of the turntable, the turntable and the disk clamper are attached to the optical disk concentrically with each other.

In this disk device, the chassis on which the optical disk rotation mechanism is mounted is supported by the device body via rubber bushes (elastic members) for absorbing vibration. Therefore, when a shock (inertial force) is given to the disk device, the chassis is instantaneously moved in the device body by the deformation (deflection) of the rubber bushes. Due to this movement of the chassis, the turntable moves in substantially parallel with the optical disk in some cases.

In the related disk device, in the case where a shock is given to the disk device under the condition that the disk clamper is engaged with the turntable (the disk clamper is in a clamping state), a distance of the above instantaneous movement of the turntable exceeds a movable range (amount of clearance) of the disk clamper. Then, an excessively strong force to move the turntable and disk clamper in the lateral direction acts in the disk device. Due to this excessively strong force, there is a possibility that the positioning boss of the disk clamper is broken.

SUMMARY OF THE INVENTION

It is therefore an object of the present invention to provide a disk device capable of positively preventing a disk clamper from being damaged in the case where a shock is given to the disk device in a clamping state.

The above object can be accomplished by the present invention described in the following items (1) to (12).

(1) A disk device for playing back information recorded on an optical disk, comprising:
a device body;
a disk tray, moving between a charging position in which the optical disk is charged into the device body, and a discharging position in which the optical disk is discharged form the device body;
a chassis, provided in the device body;
a turntable, provided on the chassis, and moving between an ascending position and a descending position in the device body in accordance with a movement of the chassis, and the turntable on which the optical disk is set; and
a disk clamper, pivotally arranged on an upper plate of the device body, and clamping the optical disk against the turntable when the turntable is moved to the ascending position,
wherein the disk clamper is arranged on the upper plate with a clearance therebetween so that the disk clamper is moved in all radial directions; and
wherein an amount of the clearance in a first direction, in which the disk tray moves from the discharging position to the charging position, is smaller than amounts of the clearance in the other directions.

(2) A disk device according to the above item (1), wherein a body portion of the disk clamper is idly engaged in a substantially circular opening formed on the upper plate; and
wherein the opening is formed in a shape in which a radius of the opening on the first direction side is smaller than radiuses of the other directions.

(3) A disk device according to the above item (2), wherein the opening is formed in a shape substantially surrounded by an arc segment and a line segment connecting both ends of the arc segment.

(4) A disk device according to the above item (2) or (3), wherein a difference between the maximum radius and the minimum radius of the opening is 0.3 to 0.5 mm.

(5) A disk device according to one of the above items (2) to (4), wherein the disk clamper has a body portion inserted into the opening and an engaging portion incapable of passing through the opening; and
wherein the disk clamper is supported by the upper plate so that the engaging portion is engaged with an edge portion of the upper plate in the periphery of the opening when the turntable is not ascended.

(6) A disk device according to the above item (5), wherein the disk clamp is arranged so as to move with respect to the upper plate in a direction of a rotary shaft thereof; and
wherein an amount of the clearance of the disk clamper in the radial direction in a state that the engaging portion comes into contact with the edge portion of the upper plate in the periphery of the opening is smaller than an amount of the clearance of the disk clamper in the radial direction in a state that the engaging portion is separated from the edge portion of the upper plate in the periphery of the opening.

(7) A disk device according to the above item (5), wherein a diameter of the body portion of the disk clamper is gradually reduced toward the disk tray.

(8) A disk device according to one of the above items (1) to (7), wherein an amount of the clearance of disk clamper in the first direction is smaller than amounts of the clearance in the other directions by 0.3 to 0.5 mm.

(9) A disk device according to one of the above items (1) to (8), wherein the disk clamper has a boss protruding from a center of the disk clamper;
wherein the turntable has a hole or recess at a center of the turntable; and
wherein the boss is inserted into the hole or recess when the optical disk is clamped between the disk clamper and the turntable.

(10) A disk device according to one of the above items (1) to (9), wherein a magnet is provided on at least one of the turntable and the disk clamper; and
wherein the disk clamper is attracted to the turntable by an attraction force of the magnet.

(11) A disk device according to one of the above items (1) to (10), wherein the chassis is supported to the device body via an elastic member.

(12) A disk device according to one of the above items (1) to (11), wherein the chassis is pivotally provided on the device body.

In the above configurations, the disk clamper is not given an excessively strong force even when a shock acts on the clamper in the clamping state. Therefore, it is possible to positively prevent the disk clamper from being damaged. The above effect can be exhibited without deteriorating the smoothness and positiveness of the clamping motion in which the disk clamper and the turntable are engaged with each other.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Referring to the accompanying drawings, a preferred embodiment of the disk device of the present invention will be explained in detail as follows.

Figure 1:
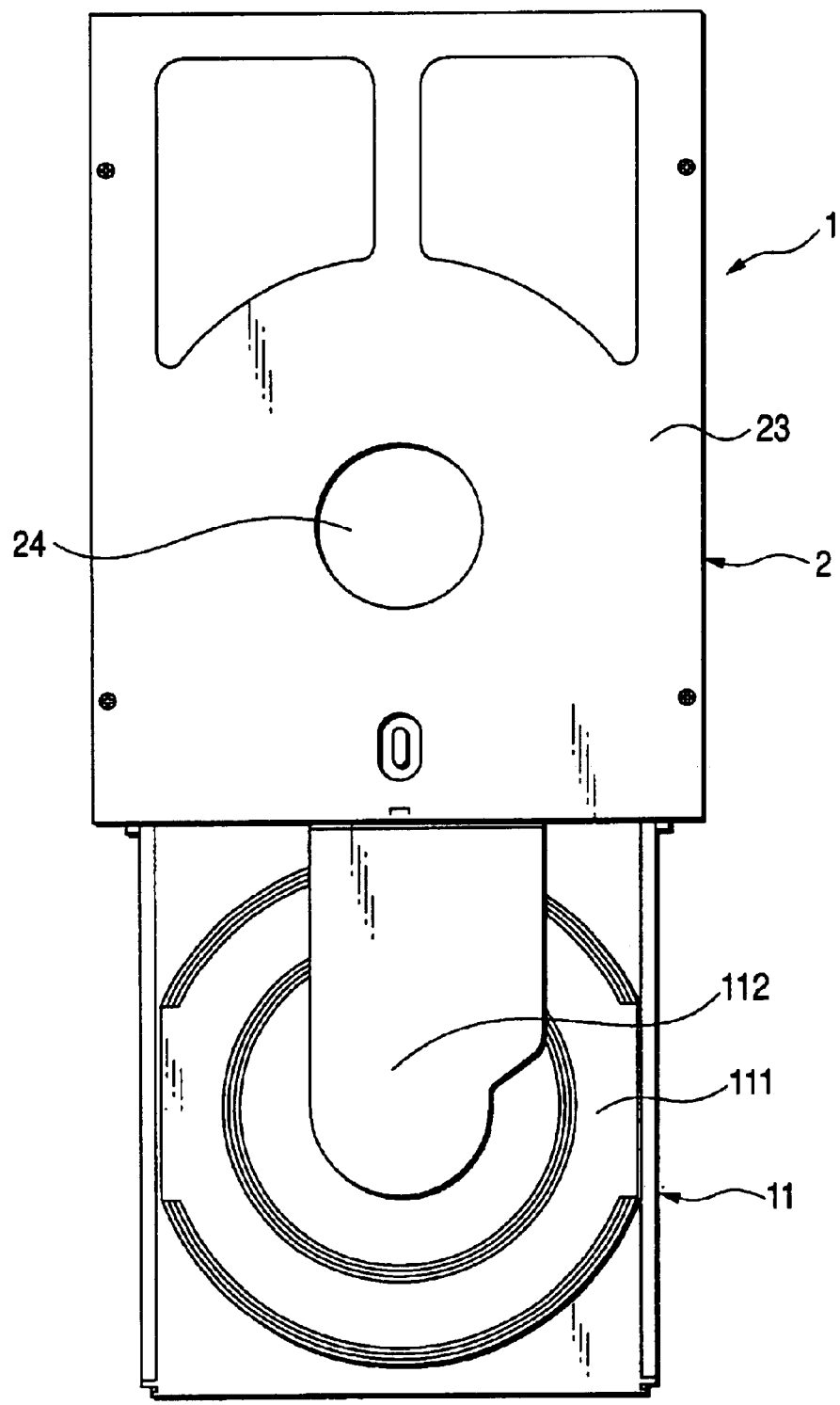
FIG. 1 is a plan view showing the disk device according to an embodiment of the present invention (showing a state in which the disk tray is discharged)
Figure 2:
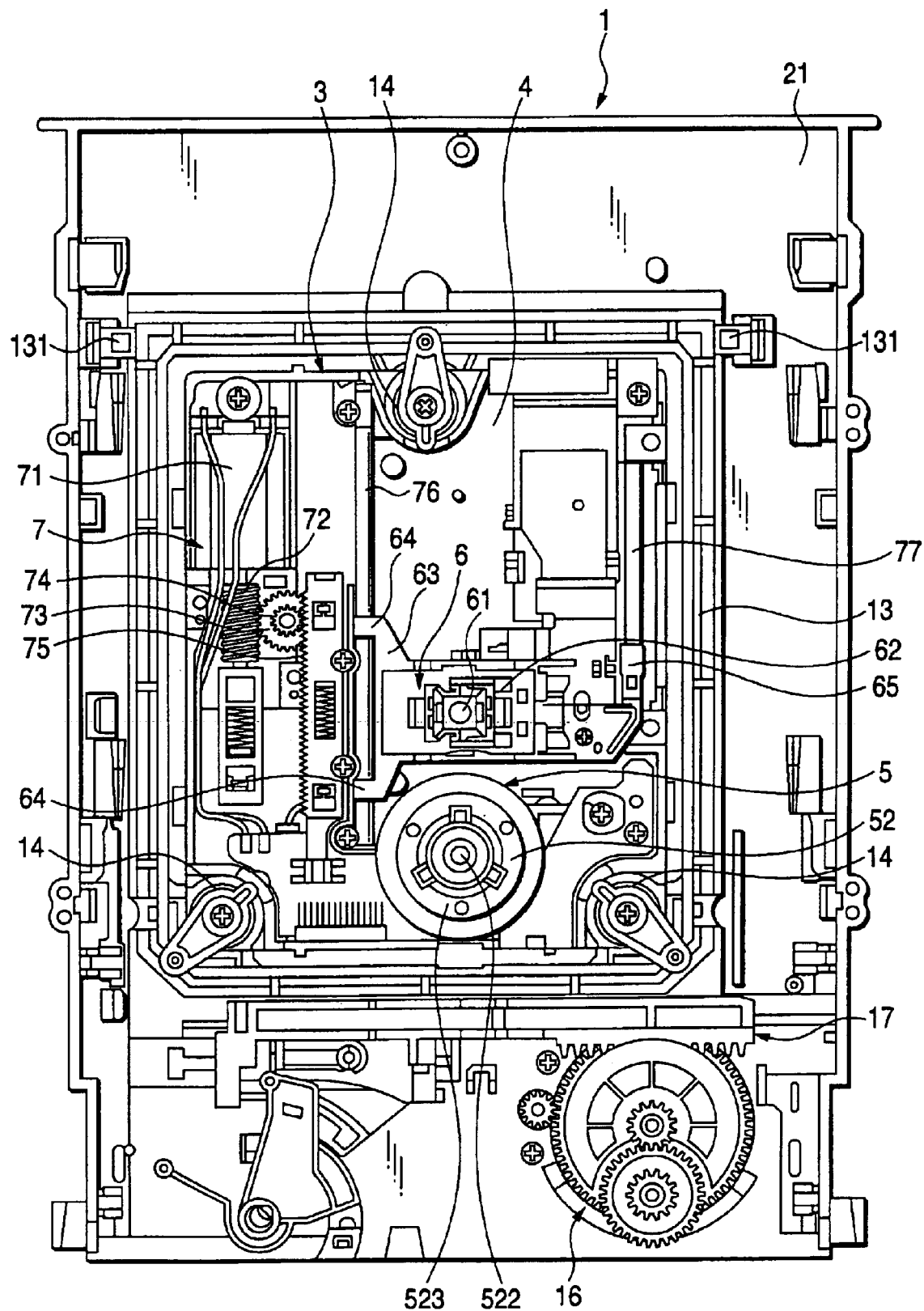
FIG. 2 is a plan view showing an inner structure of the disk device of FIG. 1.
Figure 3:
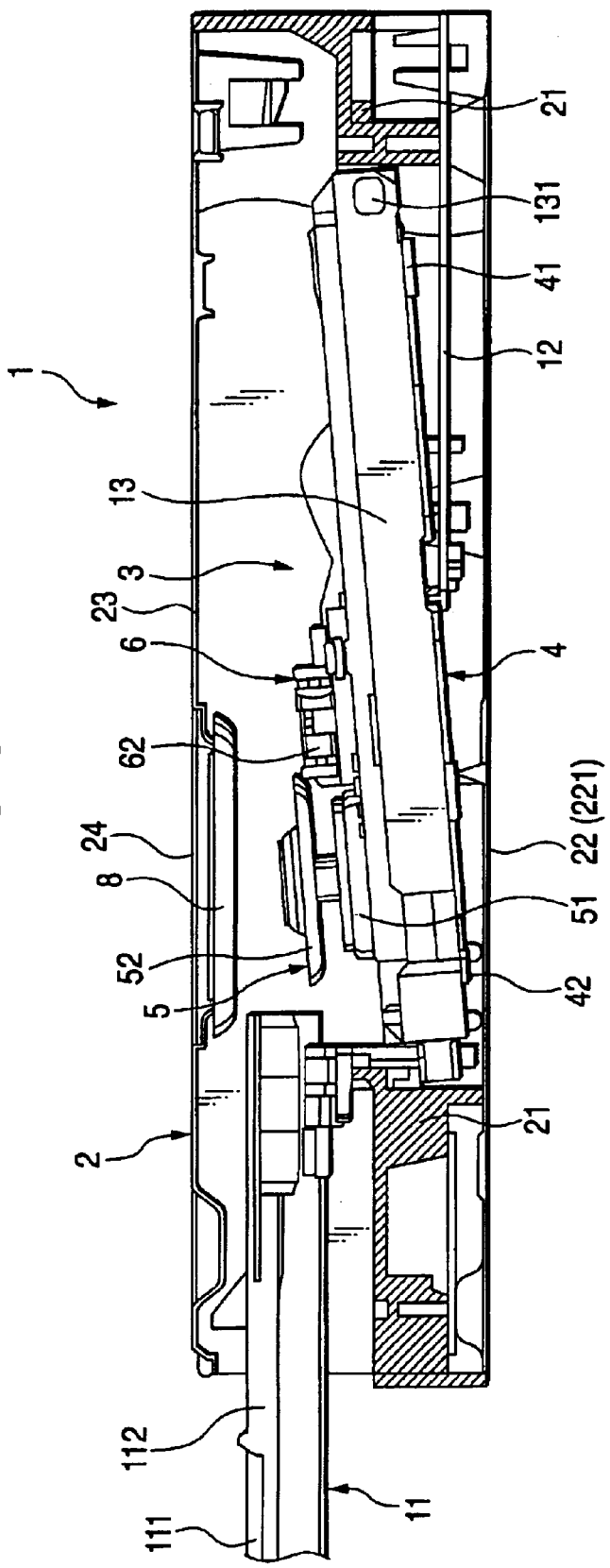
FIG. 3 is a sectional side view showing the disk device of FIG. 1 (showing a state in which the disk tray is discharged)
Figure 4:
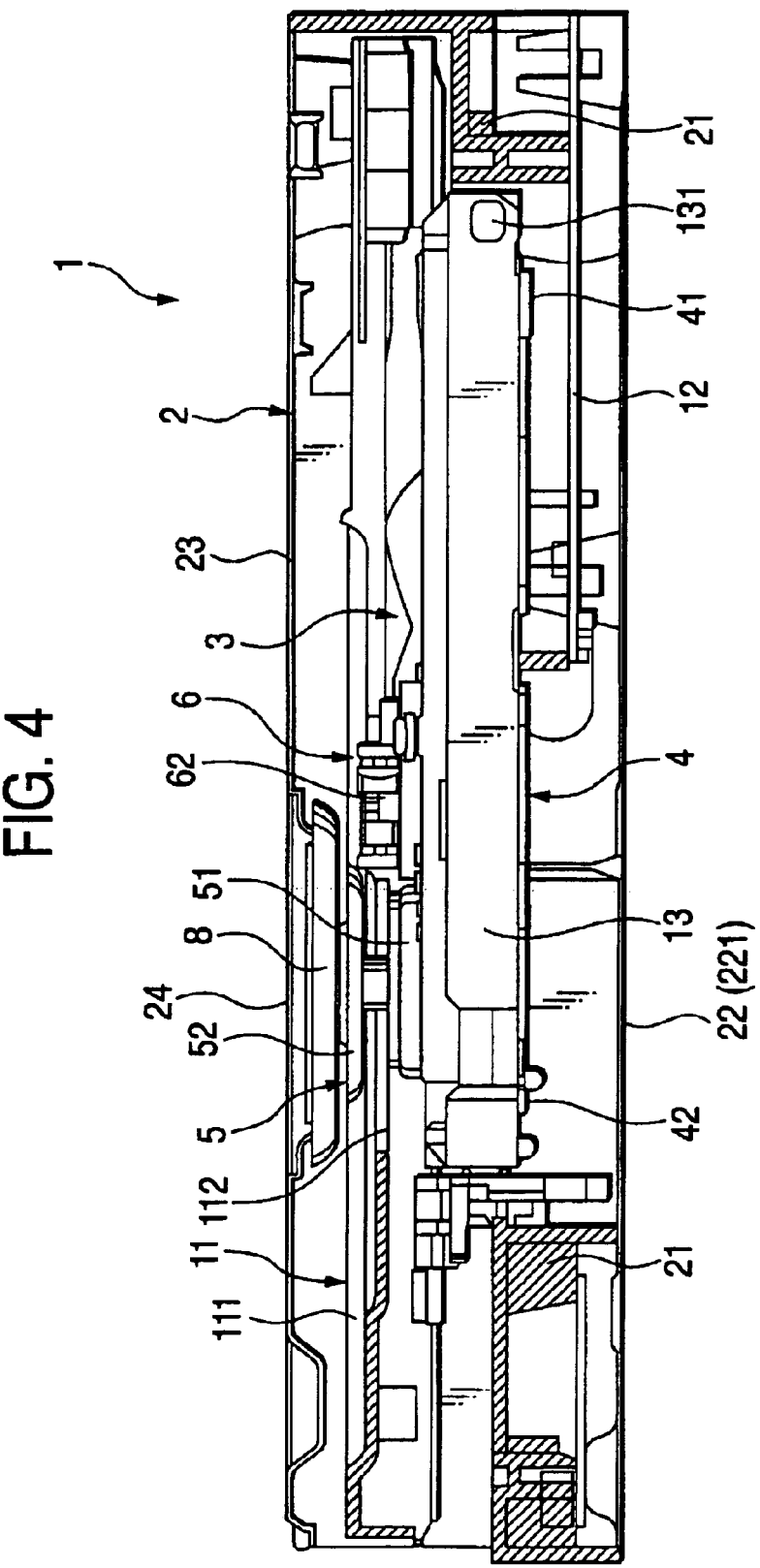
FIG. 4 is a sectional side view showing the disk device of FIG. 1 (showing a state in which the disk tray is charged)
Figure 5:
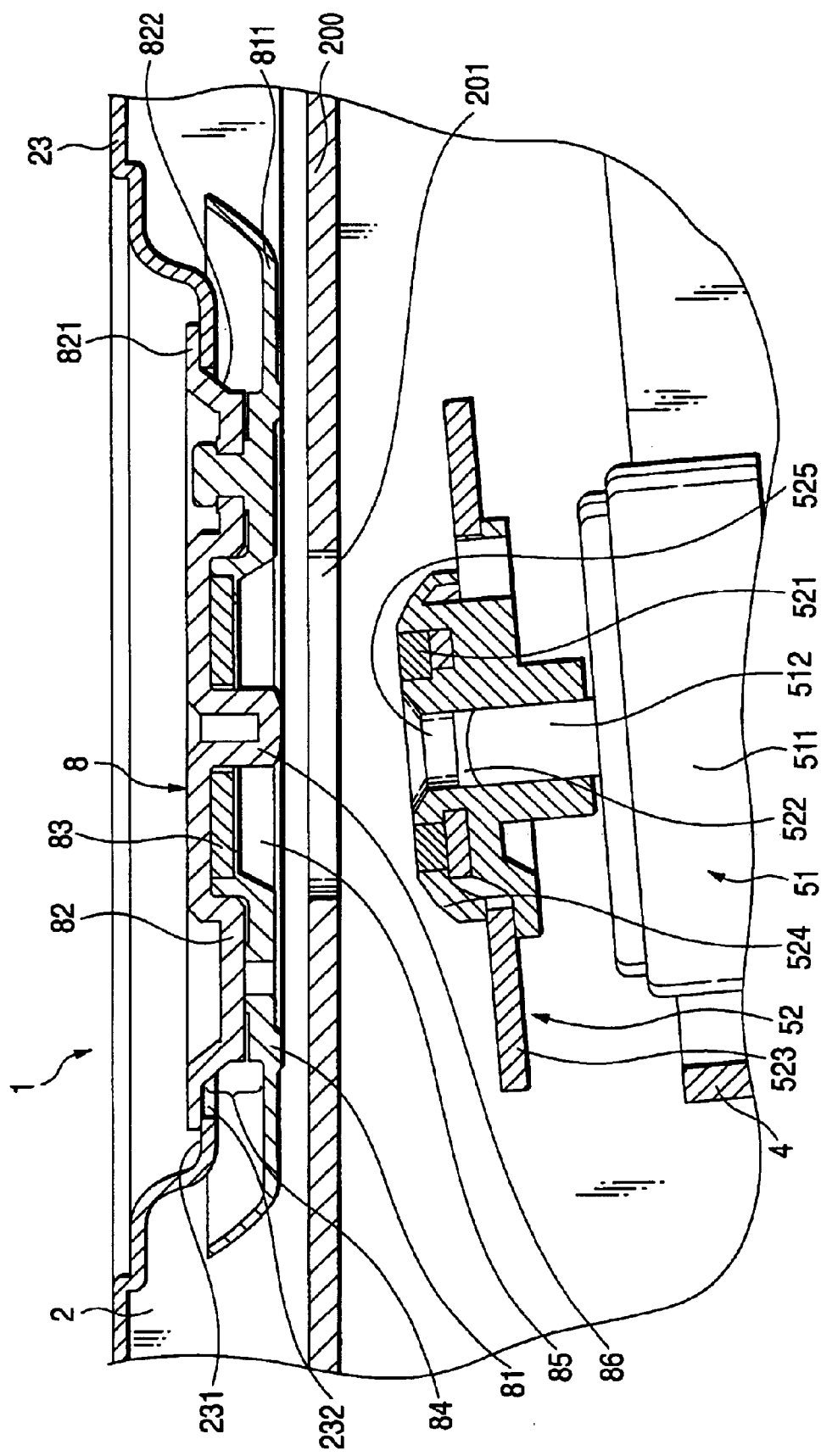
FIG. 5 is a sectional side view showing a vicinity of the disk clamper and turntable of the disk device illustrated in FIG. 1 (showing a state before clamping)
Figure 6:
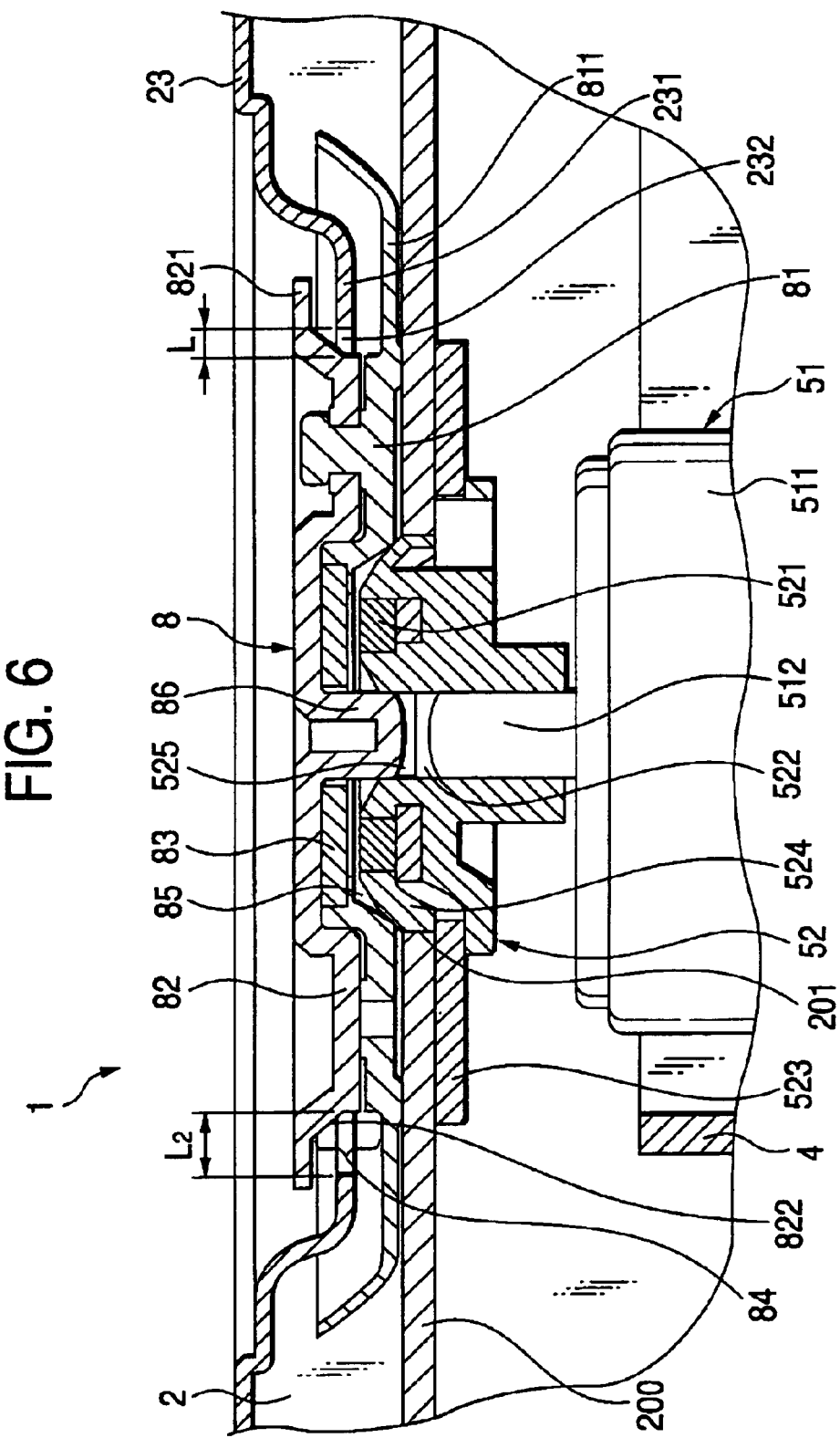
FIG. 6 is a sectional side view showing a vicinity of the disk clamper and turntable of the disk device illustrated in FIG. 1 (showing a state of clamping)
Figure 7:
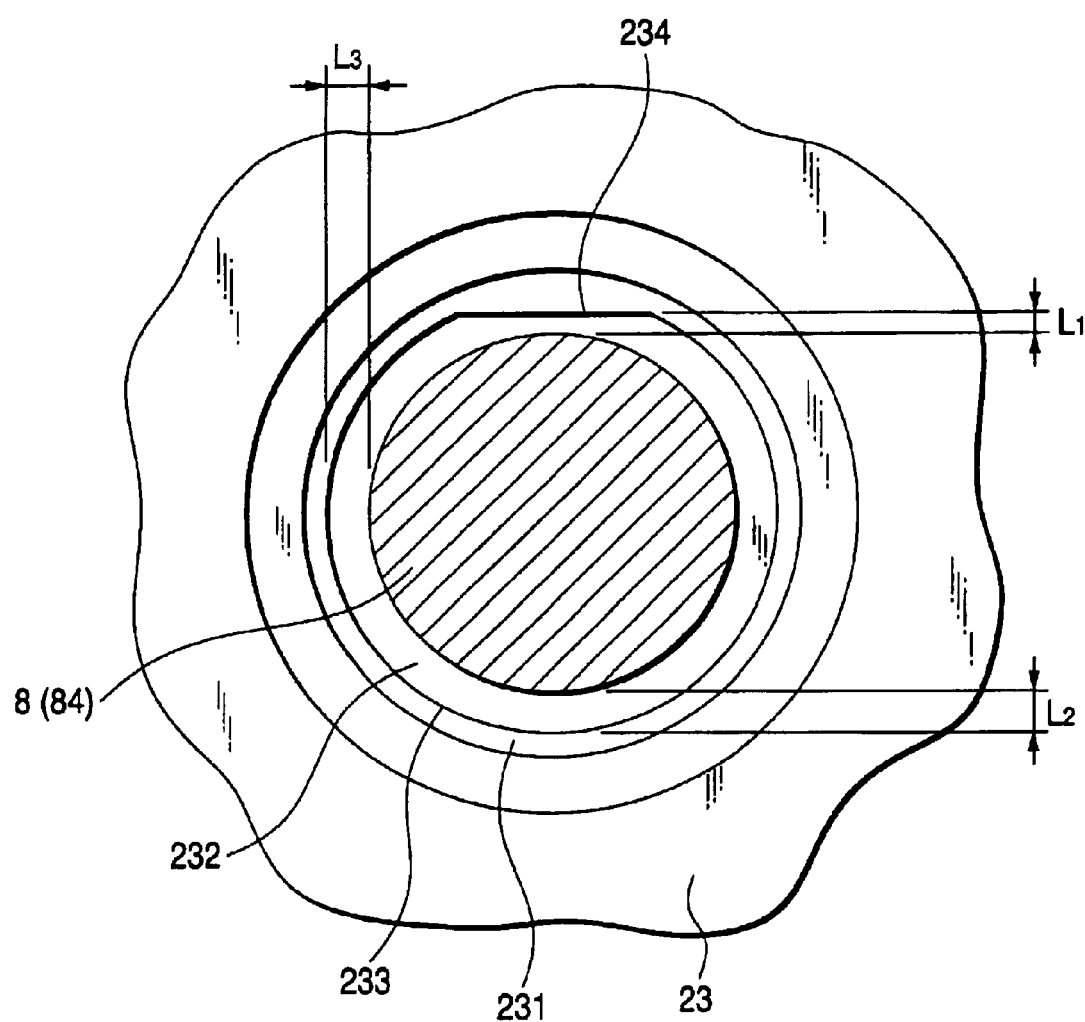
FIG. 7 is a plan view showing a vicinity of the roof of the device body of the disk device illustrated in FIG. 1.

FIG. 1 is a plan view showing the disk device according to an embodiment of the present invention, FIG. 2 is a plan view showing an internal structure of the disk device shown in FIG. 1, FIGS. 3 and 4 are respectively sectional side views showing the disk device illustrated in FIG. 1, FIGS. 5 and 6 are respectively sectional side views showing a vicinity of a disk clamper and turntable of the disk device illustrated in FIG. 1, and FIG. 7 is a plan view showing a vicinity of an opening of a roof of the device body of the disk device illustrated in FIG. 1. In this connection, for the convenience of making an explanation, unless a specific description is made, the left in FIGS. 3 to 6 is defined as "the front", the right in FIGS. 3 to 6 is defined as "the rear", the upper in FIGS. 3 to 6 is defined as "the upper", and the lower in FIGS. 3 to 6 is defined as "the lower".

The disk device shown in these drawings has a function of playing back (recording and playing back) information recorded on an optical disk such as a CD for music use, CD-ROM, CD-R, CD-RW or DVD. For example, the disk device shown in these drawings is arranged in a main body of a computer (not shown) such as a personal computer.

As shown in these drawings, the disk device 1 includes: a device body 2; a disk tray 11 on which the optical disk 20 is mounted, moving to the front and rear with respect to the device body 2; and a thread mechanical unit 3 arranged inside the device body 2. The structure of each component will be explained below.

As shown in FIGS. 1 to 3, the device body 2 includes: a frame 21; a casing 22 for covering a lower and a side portion of the frame 21; and a roof (lid) 23 for covering an upper portion of the frame 21.

A disk tray 11, disk tray moving mechanism 16, thread mechanical unit 3 and main circuit board 12 are arranged (mounted) in the frame 21.

The casing 22 is fixed to the frame 21, for example, by screwing. A lower portion of the frame 21 is covered with the bottom plate 221 of the casing 22. A roof 23 is fixed to an upper portion of the frame 21, for example, by screwing. Therefore, a space for accommodating the disk tray 11 is formed between the frame 21 and the roof 23.

In this connection, the frame 21 and the disk tray 11 are respectively made of resin by molding. The casing 22 and the roof 23 are respectively composed of a sheet-shaped member deformed into a predetermined shape by press forming.

A disk clamper 8 is pivotally arranged at a position on the roof 23 opposing to the turntable 52.

On the main circuit board 12, there is provided a circuit for controlling various actions of the disk device 1. Further, on the main circuit board 12, there are provided an interface connector for connecting the circuit with the main body of the computer, various IC such as a micro processor, memory and motor driver, and various electronic parts such as resisters, condensers and switches. As shown in FIGS. 3 and 4, the main circuit board 12 is arranged on the lower side of the thread mechanical unit 3 (chassis 4).

The disk tray 11 has a shallow recessed disk accommodating portion 111, and the optical disk 200 is conveyed while it is accommodated in this disk accommodating portion 111.

The disk tray 11 is moved (slid) in the front and rear direction with respect to the device body 2 by the disk tray moving mechanism 16 mounted on the frame 21. The disk tray 11 is capable of moving between the charging position (shown in FIG. 4), to which the optical disk 200 is charged, and the discharging position (shown in FIG. 3) from which the optical disk 200 is discharged. In the state in which the disk tray 11 is located at the charging position (This state will be referred to as "a charging state", hereinafter.), the entire disk tray 11 is accommodated in the device body 2. In the state in which the disk tray 11 is located at the discharging position (This state will be referred to as "a discharging state", hereinafter.), the most part of the disk tray 11 protrudes to the front from the device body 2.

As shown in FIG. 2, inside the device body 2, there is provided a frame member 13 for supporting the thread mechanical unit 3. The frame member 13 is formed into a substantially rectangular frame shape. On both sides at the rear end portion of the frame member 13, the shafts 131 are respectively protruded. Each shaft 131 is pivotally supported by a receiving section formed in the frame 21. Due to the above structure, the frame member 13 can be rotated round the shafts 131 with respect to the device body 2.

Since the frame member 13 is driven by the drive mechanism 17, the frame member 13 becomes substantially parallel with the roof 23 and the bottom plate 221 in the charging state (Refer to FIG. 4.). In the discharging state, the front side of the frame member 13 is displaced downward.

Therefore, the frame member 13 is inclined with respect to the roof 23 and the bottom plate 221 (Refer to FIG. 3.).

The thread mechanical unit 3 is arranged inside the frame member 13. The thread mechanical unit 3 mainly includes: a chassis 4; an optical disk rotation driving mechanism 5; an optical pickup (optical head) 6; and an optical pickup moving mechanism 7.

The chassis 4 is formed into a substantial plate-shape, in the edge portion of which a rib portion (wall portion) is formed. The optical disk rotation driving mechanism 5, optical pickup 6 and optical pickup moving mechanism 7 are respectively arranged (mounted) on the chassis 4.

The chassis 4 is fixed to the frame member 13 via three rubber bushes (elastic members) 14. That is, the chassis 4 is supported by the device body 2 via the bushes 14. Vibration and shock can be absorbed by these rubber bushes 14.

The optical disk rotation driving mechanism 5 includes: a spindle motor 51; and a turntable 52 fixed to the rotor 511 of the spindle motor 51. This optical disk rotation driving mechanism 5 is arranged on the front side of the chassis 4. This optical disk rotation driving mechanism 5 attaches (places) the optical disk 200 on the turntable 52 and rotates this the optical disk 200.

The optical pickup 6 includes: an objective lens 61; an actuator 62 for driving the objective lens 61 in the optical axis direction (focusing direction) and the radial direction (tracking direction) of the optical disk 200; a laser beam source; a condensing optical system; a beam splitter (or half mirror); an image sensor for detecting information and for detecting a focusing signal and tracking signal; and a support member 63 for supporting these components. The optical pickup 6 guides a reflected laser beam, which has been irradiated on a recording face of the optical disk 200, to the image sensor via the objective lens and the beam splitter (or half mirror).

In the charging state, the objective lens 61 is exposed to the disk accommodating section 111 from the opening 112 formed on the disk tray 11, so that the objective lens 61 can face a recording face of the optical disk 200.

The support member 63 is made of metal by die casting. On the left of the support member 63 in FIG. 2, there are provided a pair of sliding sections 64 in which a hole is formed so that the guide shaft 76 can be inserted into the hole. On the right of the support member 63 in FIG. 2, there is provided a sliding section 65 which is engaged with the guide shaft 77 and slid along the guide shaft 77.

The optical pickup moving mechanism 7 includes: a thread motor 71 capable of being normally rotated and reversed; a worm 72 fixed to a rotary shaft of the thread motor 71; a large diameter gear 73 meshed with the worm 72; a small diameter gear 74 fixed to the large diameter gear 73, rotated concentrically with the large diameter gear 73; a rack gear 75 fixed to the support member 63, meshed with the small diameter gear 74; and a pair of guide shafts 76, 77 defining a moving path of the support member 63, guiding the support member 63.

When the thread motor 71 is driven, the torque generated by the thread motor 71 is successively transmitted to the worm 72, large diameter gear 73, small diameter gear 74 and rack gear 75. Therefore, the support member 63 is moved in a predetermined moving range in the radial direction of the optical disk 200 along the guide shaft 76, 77. In this case, according to the rotational direction of the thread motor 71, the support member 63 is moved either in the direction in which the support member 63 comes close to the rotary center of the optical disk 200 or in the direction in which the support member 63 is separated from the rotary center of the optical disk 200.

The chassis 4 (thread mechanical unit 3) is rotated with respect to the device body 2 together with the frame member 13. As shown in FIG. 3, the shaft 131, which is a rotary center, is located at a position in the periphery of the rear end of the chassis 4. The rear end of the chassis 4 is a rotary center, which is a rotary end 41 not displaced with respect to the device body 2. The front end of the chassis 4 is a displacement end 42 displaced in the substantially vertical direction.

Due to the above structure, in the charging state, the displacement end 42 of the chassis 4 (thread mechanical unit 3) ascends and becomes substantially parallel with the roof 23 and the bottom plate 221 (Refer to FIG. 4.). In the discharging state, the displacement end 42 of the chassis 4 (thread mechanical unit 3) descends and inclines to the roof 23 and the bottom plate 221 (Refer to FIG. 3.). According to the above movement of the chassis 4, the optical disk rotation driving mechanism 5 moves in the device body 2 between the ascending position (position shown in FIG. 4) and the descending position (position shown in FIG. 3).

When the optical disk rotation driving mechanism 5 is located at the descending position, the turntable 52 is set at a position on the lower side of the disk tray 11, so that the turntable 52 can not interfere with the disk tray 11 which is moving to the discharging position (Refer to FIG. 3.).

When the optical disk rotation driving mechanism 5 is located at the ascending position, the turntable 52 is protruded (exposed) from the opening 112 into the disk accommodating section 111. Therefore, the optical disk 200 charged into the device body 2 is attached (set) to the turntable 52. In this state, the disk clamper 8 is attracted to the magnet 521 arranged on the turntable 52. Accordingly, the optical disk 200 is held between the turntable 52 and the disk clamper 8 (Refer to FIGS. 4 and 6.).

The structure of the turntable 52 and the disk clamper 8 will be explained in detail as follows.

As shown in FIG. 5, under the condition that the rotary shaft 512 of the spindle motor 51 is engaged into the hole 522 formed at the center of the turntable 52, the turntable 52 is fixed (attached) to the rotor 511 of the spindle motor 51. The rotary shaft 512 is inserted into the middle portion of the hole 522. Therefore, the rest portion of the hole 522 forms a recess portion 525 at the center of the turntable 52.

The turntable 52 is provided with a circular flange portion 523 protruding to the outer circumferential side on the entire circumference. The optical disk 200 is set on this flange portion 523.

The turntable 52 is provided with a protruding portion 524, the profile of which is a substantial frustum of circular cone protruding from the center of the flange portion 523. Under the condition that the optical disk 200 is set on the flange portion 523, the protruding portion 524 is substantially tightly inserted into the hole 201 formed at the center of the optical disk 200. Due to the foregoing, the optical disk 200 is set on the turntable 52 while the center of the optical disk 200 agrees with the center of the turntable 52.

At the protruding portion 524, the ring-shaped (annular) magnet (permanent magnet) 521 is arranged being embedded. In this connection, the magnet 521 may be arranged on the disk clamper 8 side.

A portion of the roof 23 opposing to the turntable 52 is formed swelling onto the inner face side. This portion swelling onto the inner face side becomes an arranging portion 231 in which the disk clamper 8 is arranged. In this arranging portion 231, a substantially circular opening (hole) 232 is formed.

Since the arranging portion 231 is formed on the roof 23, the outer face side of the portion of the roof 23, in which the arranging portion 231 is formed, is formed into a recess portion. As shown in FIGS. 1, 3 and 4, the recess portion on the outer face side of the arranging portion 231 is closed by the disk 24. In FIGS. 5 and 6, the disk 24 is omitted.

As shown in FIG. 7, the opening 232 is substantially circular, however, the radius of the opening 232 is a little small at the rear side. In the structure shown in the drawing, the opening 232 is formed into a profile (D-cut profile) which is surrounded by the arc 233 and the line segment connecting both ends of the arc 233. However, the profile of the opening 232 is not limited to the above specific embodiment. As long as the radius becomes small at the rear side, any profile may be adopted.

As shown in FIG. 5, the disk clamper 8 is exposed onto the inner face side of the roof 23. The disk clamper 8 includes: a substantially disk-shaped first member 81 coming into contact with the optical disk 200; a substantially disk-shaped second member 82 arranged on the upper side of the first member 81 being fixed concentrically with the first member 81; and a disk-shaped metallic member 83 interposed between the first member 81 and the second member 82. The first member 81 and the second member 82 are preferably made of resin by molding.

In this disk clamper 8, the short columnar (cylindrical) body portion 84 is formed by the upper portion of the first member 81 and the lower portion of the second member 82. The diameter (outer diameter) of the body portion 84 is smaller than the diameter (inner diameter) of the opening 232. Therefore, when the body portion 84 of the disk clamper 8 is idly engaged in the opening 232, that is, when the body portion 84 of the disk clamper 8 is engaged in the opening 232 while a gap is formed between them, the disk clamper 8 is arranged having clearance between the disk clamper 8 and the opening 232. Due to the above structure, it is possible for the disk clamper 8 to move with respect to the roof 23 in all radial directions.

In the portion including the body portion 84 of the second member 82, there is formed a tapered portion 822, the diameter of which is gradually decreased when it comes close to the disk tray 11, that is, the diameter of which is gradually decreased downward.

At the upper end portion of the second member 82 (body portion 84), there is provided a flange portion (engaging portion) 821 protruding to the outer circumferential side all over the circumference. The outer diameter of this flange portion 821 is larger than the diameter of the opening 232. Therefore, it is impossible for the flange portion 821 to pass through the opening 232. Under the condition that the turntable 52 is not ascended, that is, under the condition shown in FIG. 5, when the flange 821 is engaged with the outer face of the roof 23 (arranging portion 231) in the periphery of the opening 232, the disk clamper 8 is supported by the roof 23. In this connection, the engaging portion of the flange portion 821 is not limited to a ring-shaped portion protruding all over the circumference. As long as the profile can not pass through the opening 232, for example, pawls intermittently formed in the circumferential direction may be used for the engaging portion.

In the lower end portion of the first member 81, there is provided a disk-shaped contacting portion 811, the diameter of which is larger than that of the body portion 84. When the turntable 52 and the disk clamper 8 hold the optical disk 200 as shown in FIG. 6, at least one portion of this contacting portion 811 comes into contact with the optical disk 200. A portion in the periphery of the outer circumference of the contacting portion 811 is bent upward. Therefore, it is formed into a skirt-shape.

The disk clamper 8 can be moved in the range of the length of the body section 84 in the rotary shaft direction (vertical direction) with respect to the roof 23.

At the center of the lower face of the disk clamper 8, there is provided a recess portion 85, the profile of which is a substantial frustum of circular cone. From the center of the bottom portion of the recess portion 85, there is provided a positioning boss 86 which is formed integrally with the second member 82. At the bottom portion (bottom face) of the recess portion 85, the metallic member 83 is exposed.

In the state shown in FIG. 6 (This state will be referred to as "a clamping state", hereinafter.), the protruding portion 524 of the turntable 52 is inserted into and engaged with the recess portion 85, and the positioning boss 86 is inserted into and engaged with the recess portion 525. Due to the foregoing, it is possible to obtain a state in which the center of the disk clamper 8 agrees with the center of the turntable 52. In the clamping state, when the magnet 521 magnetically attracts the metallic member 83, the disk clamper 8 is attracted to the turntable 52, and the optical disk 200 can be held between the disk clamper 8 and the turntable 52.

In the clamping state, while the disk clamper 8 is being lifted by the turntable 52, the disk clamper 8 moves upward a little, and the flange portion 821 is separated from the outer face of the arranging portion 231 of the roof 23. In this state, in the structure shown in the drawing, a portion close to the lower end portion of the tapered portion 822 is positioned at the height of the arranging portion 231.

An amount of clearance (movable range) of the disk clamper 8 with respect to the roof 23 in the rear radial direction is smaller than amounts of clearance (movable ranges) of the disk clamper 8 with respect to the roof 23 in the other radial directions. In this connection, the amount of clearance of the disk clamper 8 is defined as a distance by which the disk clamper 8 can be moved in the radial direction from the position of the disk clamper 8 in the state shown in FIG. 7 in which the center of the disk clamper 8 and the center of the opening 232 (arc 233) agree with each other.

As shown in FIGS. 6 and 7, since the opening 232 is formed into the profile described above, in the clamping state, the amount of clearance $L_1$ of the disk clamper 8 in the rear direction is smaller than the amounts of clearance in the other directions such as the amount of clearance $L_2$ in the front direction and the amount of clearance $L_3$ in the side direction (lateral direction) of the device body 2. In the structure shown in the drawings, the amounts of clearance in the directions except for the rear direction are constant, for example, $L_2=L_3$. However, the amounts of clearance in the directions except for the rear direction may not be constant, for example, $L_2 \neq L_3$. The amount of clearance in the rear direction is not only an amount of clearance in the rear direction in the strict meaning but also an amount of clearance in the direction close to the rear direction.

In this connection, the disk clamper 8 shown in FIG. 7 is a sectional view showing a state in which the disk clamper 8 is cut off at a portion of the same height as that of the arranging portion 231 in FIG. 6.

In this connection, in the disk device 1, when a shock (inertial force) acts on the disk device 1 by a fall or collision (This case will be referred to as "in the case of shock", hereinafter.), since the chassis 4 is supported by the device body 2 via the rubber bushes 14 as described before, the chassis 4 is instantaneously moved in the device body 2 because of the deformation (deflection) of the rubber bushes 14. When the above phenomenon is caused in the clamping state, the turntable 52 is moved in a direction substantially parallel with the roof 23 (optical disk 200) according to the movement of the chassis 4.

In the disk device 1 of the present invention, the amounts of clearance ($L_2$ and $L_3$) of the disk clamper 8 in the directions except for the rear direction of the disk clamper 8 are ensured to be sufficiently large so that the amounts of clearance ($L_2$ and $L_3$) of the disk clamper 8 can be the same as the distance of the movement of the turntable 52 in the case of shock or the amounts of clearance ($L_2$ and $L_3$) of the disk clamper 8 can be larger than that. Due to the foregoing, the disk clamper 8 can be freely moved together with the turntable 52 in the case of shock. As a result, an excessively strong force is not given to the positioning boss 86 and others. Accordingly, it is possible to prevent the disk clamper 8 from being damaged in the case of shock in the clamping state, for example, it is possible to prevent the positioning boss 86 from being broken.

On the other hand, in the related disk device, since the amount of clearance of the disk clamper is relatively small in the clamping state, in the case where a relatively strong shock is given to the disk device in the clamping state, the turntable is moved by a distance exceeding the amount of clearance of the disk clamper. As a result, an excessively strong force is given so that the turntable and the disk clamper are shifted from each other in the lateral direction, that is, the turntable and the disk clamper are separated from each other. There is a possibility that the positioning boss of the disk clamper is broken by this force.

In the disk device 1, the amount of clearance of the disk clamper 8 in the rear direction is smaller than the amounts of clearance of the disk clamper 8 in the other directions. Therefore, when the state is changed from the state before clamping to the state of clamping, that is, when the clamping motion is conducted while the disk clamper 8 is prevented from being damaged (while the positioning boss 86 is prevented from being broken), the turntable 52 can be smoothly and positively engaged with the disk clamper 8. The reason is described as follows.

When the disk tray 11 is moved from the discharging state shown in FIG. 3 to the charging state shown in FIG. 4, in the case where the optical disk 200 is relatively thick or inappropriately set on the disk tray 11, the optical disk 200 comes into contact with the disk clamper 8. As a result, the disk clamper 8 is moved to the rear in the movable range. In the disk device 1 of the present invention, even when the disk clamper 8 is moved to the rear before clamping, the amount of clearance at the rear of the disk clamper 8 is relatively small. Therefore, a positional difference (amount of eccentricity) between the center of the disk clamper 8 and the center of the turntable 52 is small (Refer to FIG. 5.). Therefore, when the clamping motion is conducted in the state shown in FIG. 5, the disk clamper 8 and the turntable 52 can be smoothly and positively engaged with each other, that is, the positioning boss 86 and the recess portion 525 can be smoothly and positively engaged with each other and the recess portion 85 and the protruding portion 524 can be also smoothly and positively engaged with each other. Therefore, the state can be smoothly and positively transferred to the clamping state shown in FIG. 6.

On the other hand, when the amount of clearance in the rear direction of the disk clamper is large in the same manner as that of the amounts of clearance in the other directions of the disk clamper, which is different from the structure of the present invention, that is, when the opening (corresponding to the opening 232) of the roof is a substantially perfect circle, in the case of occurrence of the above phenomenon, the disk clamper is moved to a rear position exceeding the state shown in FIG. 5, and a positional difference (amount of eccentricity) between the center of the disk clamper and the center of the turntable is increased. As a result, when the clamping motion is conducted, the turntable can not be smoothly engaged with the disk clamper, and further the engagement of the turntable with the disk clamper fails.

In this connection, the amount of clearance $L_1$ in the rear direction of the disk clamper 8 in the clamping state is smaller than the amounts of clearance in the other directions. From the viewpoint of the supporting structure of the chassis 4 (frame member 13) with respect to the device body 2, a distance of movement of the disk clamper 8 is so short that no problems are caused even if the disk clamper 8 is moved in the rear direction.

In this embodiment, since the tapered portion 822 is formed in the body portion 84, the diameter of the body portion 84 close to the flange portion 821 is relatively large, and the diameter of the body portion 84 on the lower side of the tapered portion 822 is relatively small. Due to the foregoing, an amount of clearance of the clamper 8 in the radial direction in the state in which the flange portion 821 comes into contact with the outer face of the arranging portion 231 is smaller than an amount of clearance of the clamper 8 in the radial direction in the state in which the flange portion 821 is separated from the outer face of the arranging portion 231 (clamping state). That is, in the clamping state, the amount of clearance in the radial direction of the disk clamper 8 is sufficiently ensured. In the state before clamping, the amount of clearance in the radial direction of the disk clamper 8 is relatively small. As a result, when the phenomenon is caused in which the optical disk 200 comes into contact with the disk clamper 8 in the movement of the disk tray 11, it is possible to reduce a positional difference between the center of the disk clamper 8 and the center of the turntable 52. Therefore, the disk clamper 8 and the turntable 52 can be more smoothly and positively engaged with each other in the case of clamping. In this connection, the tapered portion 822 may not be necessarily formed in the present invention.

A difference between the amount of clearance of the disk clamper 8 in the rear direction and the amounts of clearance in the other directions, in other words, a difference ($L_2-L_1$) between the maximum radius and the minimum radius of the opening 232 is not particularly restricted, however, from the viewpoints of accomplishing the compatibility of the effect of preventing damage of the disk clamper 8 (the effect of preventing the positioning boss 86 from being broken) with the smoothness of the clamping motion, it is preferable that the amount of clearance is about 0.3 to 0.5 mm.

Referring to the embodiment shown in the drawings, the disk device of the present invention is explained above. However, it should be noted that the present invention is not limited to the above specific embodiment. Each component composing the disk device can be replaced with an arbitrary component capable of exhibiting the same function. Further, an arbitrary component may be added to the structure of the present invention.

The structure in which the disk clamper is arranged is not limited to the structure in which the disk clamper is idly arranged in the opening of the roof. As long as it is arranged in such a manner that the amount of clearance in the rear direction is smaller than the amounts of clearance in the other directions, any structure can be adopted.

It is possible to apply the present invention to a vertically setting type disk device into which an optical disk is charged while the optical disk is being maintained vertical with respect to the horizontal face.

What is claimed is:

1. A disk device for playing back information recorded on an optical disk, comprising:
   a device body;
   a disk tray, moving between a charging position in which the optical disk is charged into the device body, and a discharging position in which the optical disk is discharged form the device body;
   a chassis, provided in the device body;
   a turntable, provided on the chassis, and moving between an ascending position and a descending position in the device body in accordance with a movement of the chassis, and the turntable on which the optical disk is set; and
   a disk clamper, pivotally arranged on an upper plate of the device body, and clamping the optical disk against the turntable when the turntable is moved to the ascending position,
   wherein the disk clamper is arranged on the upper plate with a clearance therebetween so that the disk clamper is moved in all radial directions; and
   wherein an amount of the clearance in a first direction, in which the disk tray moves from the discharging position to the charging position, is smaller than amounts of the clearance in the other directions.

2. The disk device as set forth in claim 1, wherein a body portion of the disk clamper is idly engaged in a substantially circular opening formed on the upper plate; and
   wherein the opening is formed in a shape in which a radius of the opening on the first direction side is smaller than radiuses of the other directions.

3. The disk device as set forth in claim 2, wherein the opening is formed in a shape substantially surrounded by an arc segment and a line segment connecting both ends of the arc segment.

4. The disk device as set forth in claim 2, wherein a difference between the maximum radius and the minimum radius of the opening is 0.3 to 0.5 mm.

5. The disk device as set forth in claim 2, wherein the disk clamper has a body portion inserted into the opening and an engaging portion incapable of passing through the opening; and
   wherein the disk clamper is supported by the upper plate so that the engaging portion is engaged with an edge portion of the upper plate in the periphery of the opening when the turntable is not ascended.

6. The disk device as set forth in claim 5, wherein the disk clamp is arranged so as to move with respect to the upper plate in a direction of a rotary shaft thereof; and
   wherein an amount of the clearance of the disk clamper in the radial direction in a state that the engaging portion comes into contact with the edge portion of the upper plate in the periphery of the opening is smaller than an amount of the clearance of the disk clamper in the radial direction in a state that the engaging portion is separated from the edge portion of the upper plate in the periphery of the opening.

7. The disk device as set forth in claim 5, wherein a diameter of the body portion of the disk clamper is gradually reduced toward the disk tray.

8. The disk device as set forth in claim 1, wherein an amount of the clearance of disk clamper in the first direction is smaller than amounts of the clearance in the other directions by 0.3 to 0.5 mm.

9. The disk device as set forth claim 1, wherein the disk clamper has a boss protruding from a center of the disk clamper;
   wherein the turntable has a hole or recess at a center of the turntable; and
   wherein the boss is inserted into the hole or recess when the optical disk is clamped between the disk clamper and the turntable.

10. The disk device as set forth in claim 1, wherein a magnet is provided on at least one of the turntable and the disk clamper; and
    wherein the disk clamper is attracted to the turntable by an attraction force of the magnet.

11. The disk device as set forth in claim 1, wherein the chassis is supported to the device body via an elastic member.

12. The disk device as set forth in claim 1, wherein the chassis is pivotally provided on the device body.

* * * * *